(12) United States Patent
Bergheaud et al.

(10) Patent No.: US 8,490,181 B2
(45) Date of Patent: Jul. 16, 2013

(54) DETERMINISTIC SERIALIZATION OF ACCESS TO SHARED RESOURCE IN A MULTI-PROCESSOR SYSTEM FOR CODE INSTRUCTIONS ACCESSING RESOURCES IN A NON-DETERMINISTIC ORDER

(75) Inventors: Philippe Bergheaud, Colmar (FR); Reinhard Buendgen, Tuebingen (DE); Martin Schwidefsky, Boeblingen (DE)

(73) Assignee: International Business Machines Corporation, Armonk, NY (US)

( * ) Notice: Subject to any disclaimer, the term of this patent is extended or adjusted under 35 U.S.C. 154(b) by 614 days.

(21) Appl. No.: 12/732,505

(22) Filed: Mar. 26, 2010

(65) Prior Publication Data
US 2010/0275260 A1 Oct. 28, 2010

(51) Int. Cl.
*G06F 7/04* (2006.01)
(52) U.S. Cl.
USPC .......................................................... 726/21
(58) Field of Classification Search
USPC ................. 726/4, 21; 718/104; 709/213–214, 709/216
See application file for complete search history.

(56) References Cited

U.S. PATENT DOCUMENTS

| 5,305,448 | A | * | 4/1994 | Insalaco et al. | 711/164 |
|---|---|---|---|---|---|
| 7,475,397 | B1 | * | 1/2009 | Garthwaite et al. | 718/101 |
| 2008/0109812 | A1 | | 5/2008 | Vertes et al. | |
| 2009/0165006 | A1 | * | 6/2009 | Ceze et al. | 718/102 |
| 2009/0235262 | A1 | * | 9/2009 | Ceze et al. | 718/102 |
| 2009/0254724 | A1 | * | 10/2009 | Vertes et al. | 711/162 |

OTHER PUBLICATIONS

Philippe Bergheaud et al "Fault Tolerance in Multprocessor Systems Via Application Cloning", 27th International Conference on Distributed Computing Systems, Toronto, 2007.
http://www-03.ibm.com/systems/z/.

* cited by examiner

*Primary Examiner* — Samson Lemma
(74) *Attorney, Agent, or Firm* — Steven Chiu

(57) ABSTRACT

Managing access to resources shared among multiple processes within a computer system. Multiple program instances of an application are almost simultaneously executed on multiple processors for fault tolerance. The replication solution supports the recording and subsequent replay of reservation events granting the shared resources exclusive access rights to the processes, when one program code instruction may request access to a set of shared resources in a non-deterministic order.

6 Claims, 3 Drawing Sheets

Primary container:

Process P1: PID = 12345

Instruction I1: PC = 1013

Secondary container:

Process P2: PID = 12345

Instruction I2: PC = 1013

DETERMINISTIC SERIALIZATION OF ACCESS TO SHARED RESOURCE IN A MULTI-PROCESSOR SYSTEM FOR CODE INSTRUCTIONS ACCESSING RESOURCES IN A NON-DETERMINISTIC ORDER

CROSS REFERENCE TO RELATED APPLICATIONS

This application claims priority under 35 U.S.C. §119 from European Patent Application No. 09305342.9 filed Apr. 22, 2009, the entire contents of which are incorporated herein by reference.

BACKGROUND

1. Field of the Invention

The present invention relates to a method for managing access to shared resources in a computer system, a computer system for executing the method, and a computer program product containing code portions to execute the method.

2. Description of Prior Art

Record and Replay is a software-based state replication solution designed to support recording and subsequent replay of the execution of applications running on multiprocessor systems for fault-tolerance. Multiple instances of the application are almost simultaneously executed in separate virtualized environments called containers. Different containers may run on different computer systems. Containers facilitate state replication between the application instances by resolving the resource conflicts and providing a uniform view of the underlying operating system across all clones. The virtualization layer that creates the container abstraction actively monitors the primary instance of the application and synchronizes its state with that of the clones, named secondary or backup instances, by transferring the necessary information to enforce identical state among them. For details, see Philippe Bergheaud, Dinesh Subhraveti, and Marc Vertes, "Fault Tolerance in Multiprocessor Systems Via Application Cloning", 27th International Conference on Distributed Computing Systems, Toronto, 2007, incorporated herein by reference.

In the record and replay technology, the execution of an application program in one of the secondary instances is following the execution of the same application program in the primary instance in loose lockstep. Keeping the instances in lockstep is realized by running the same program code instructions in the primary and secondary instances. At any point in the program flow that allows non-deterministic program code execution, the primary instance is recording the execution choices and the secondary instance is replaying the recorded decisions for the program flow rather than pursuing a non-deterministic execution.

Concurrent accesses to shared memory are a source of non-determinism in the program execution based on operating systems that are running multiple processes or multiple threads of execution in parallel. Processes or threads of execution are instances of sequential code being executed in user space, which is not part of the operating system kernel. Processes or threads reference memory locations by specifying virtual addresses. Depending on the architecture of the operating system, different processes or threads may share parts of the addressable memory. A process is multi-threaded when it contains multiple threads that share a common address space. The process is single-threaded when it has a single thread.

Assume that each of two processes needs exclusive access to two shared memory locations at almost the same time. The first process may request access and acquire a first lock to the first memory location. The second process may request access and acquire a second lock to the second memory location. In this scenario, the first process is waiting for the second process to release the second lock to the second memory location and the second process is waiting for the first process instance to release the first lock to the first memory location. This is a memory race that results in a deadlock situation, where two processes are blocking one another from continuing execution.

In computer operating system, the physical memory is divided into pages, for example, 4 kilobytes each. The access to these memory pages may be shared among multiple processes. To eliminate the non-deterministic memory races described above, access to shared memory pages must be serialized. A possible serialization mechanism allows access to a shared memory page only to a process that has an exclusive reservation for this memory page. All processes that do not have a page reservation to this memory page will fail when trying to access this memory page. To allow the access to other second processes, the first process must release the reservation of the memory page after a finite amount of time. By recording a sequence of memory page reservation events and page release events on the primary system and replaying the recorded sequence of events on the backup systems in the same order as on the primary system, memory access races will be resolved in the same way on all systems.

The implementation of the record and replay technology uses the memory page fault mechanism of the virtual memory implementation of the operating system. Virtual memory is a computer system technique which gives an application program the impression that it has contiguous working memory, while in fact the corresponding real memory may be physically fragmented and may even overflow on to disk storage. A memory page table is a memory location that describes the mapping of the virtual addresses of multiple memory pages to its real addresses and is allocated for each new process. The memory page table consists of multiple page table entries. The entries may contain information indicating that the memory page is available in memory or not. When a process instance tries to access a memory page that is currently not available, a page fault exception is thrown. Page faults typically occur when a memory page is swapped out from memory to a hard disk. In this case, the page fault handler will read the requested memory page from the hard disk to the memory before granting access to the memory page. When all memory pages are marked as not available in the memory page table, the page fault handler will be called whenever a process tries to access a memory page.

The US patent application 2008/0109812 A1, incorporated herein by reference, discloses a method for managing access to shared resources in a multi-processor environment, while these processors are working in a physical parallelism. The access management is particularly useful for carrying out a control of the accesses to such resources, for example for shared memory, in order to stabilize or optimize the functioning of a process within a multi-task application using such a parallel environment.

The prior art record and replay technology imposes a strict sequence of accesses to memory locations in the secondary instance and lets the secondary instance replay the memory access events in the same way as the primary instance. It assumes that each program code instruction executed in the secondary instance references the resources it needs to access in a deterministic order. This assumption is true for all operating system architectures that support only program code instructions that reference at most one resource.

Some computer architectures support program code instructions that reference more than one memory location directly. In addition, such a specific program code instruction may access the multiple memory locations in a non-deterministic order. An example of such a computer architecture is IBM® System z®. The computer architecture of System z does not impose an exact sequence on the accesses of memory locations. This gives the hardware developer more freedom in optimizing the implementation of the specific program code instruction.

If a program code instruction accesses multiple memory locations on the secondary instance in a second order which may be different from a first order on the primary instance, the replay on the backup instance will fail using the methods described in the prior art.

It is thus an objective of the present invention to provide a method and a system for managing the access to resources shared among multiple processes within a computer system. Multiple instances of an application are almost simultaneously executed on multiple processors for fault tolerance. The present invention should support the recording of reservation events by the primary processor and the subsequent replay of the reservation events by a secondary processor for the access to the shared resources in the same order as recorded by the primary processor, where one program code instruction may request access to a set of shared resources in a non-deterministic order.

BRIEF SUMMARY

This objective of the present invention is achieved by a method for managing access to shared resources in a computer system running at least one primary program instance and at least one secondary program instance of the same application program. The method comprises the following steps: For executing a primary instruction instance of the primary program instance, the method is requesting access to a set of primary shared resources in a first order within a primary process instance and reserving the set of primary shared resources in the first order by granting the primary process instance an exclusive right to access the members of the set of the primary shared resources unless the primary process instance has already reserved the requested primary shared resource. While reserving the members of the set of primary shared resources in the first order, the method is recording a sequence of corresponding reservation events. For executing a corresponding secondary instruction instance of the secondary program instance within a corresponding secondary process instance, the method is requesting access to a corresponding set of secondary shared resources in a second order, reading the recorded sequence of reservation events in the first order. The reservation events are controlling the reservation of the corresponding set of secondary shared resources in the first order by granting the secondary process instance an exclusive right to access the members of the set of secondary shared resources unless the secondary process instance has already reserved the requested secondary shared resource.

Another aspect of the present invention is that the reservation of a shared resource is granting an access right for reading and modifying the reserved shared resource.

Another aspect of the present invention is that the reservation event is specified by the position of the primary instruction instance in the code of the application program, the reserved primary shared resource, and the primary process instance. The members of the set of secondary shared resources are reserved when the position of the secondary instruction instance in the code of the application program corresponds to the recorded position of the primary instruction instance; when the secondary process instance corresponds to the recorded primary process instance; and until the secondary shared resource to be accessed corresponds to the recorded primary shared resource.

Another aspect of the present invention is that for executing the primary instruction instance within the first primary process instance, the method is requesting access to the members of the set of primary shared resources. While the method is consecutively reserving first members of the set of primary shared resources for exclusive access by the first primary process instance when the first members of the set of primary shared resources have not yet been reserved, and recording reservation events for the first members of the set of primary shared resources. When a second member of the set of primary shared resources has already been reserved by a second primary process instance, the method releases the reservations of the first members of the set of primary shared resources by revoking the exclusive right of the first primary process instance to access the first members of the set of primary shared resources, recording release events for the first members of the set of primary shared resources, and delaying the execution of the primary instruction instance. For executing the secondary instruction instance within the first secondary process instance, the method is requesting access to the members of the set of secondary shared resources. While reading the recorded reservation events of the first members of the set of primary shared resources, the method is consecutively reserving the members of the set of secondary shared resources corresponding to the first members of the set of primary shared resources for exclusive access by the first secondary process instance when the corresponding members of the set of secondary shared resources have not yet been reserved. When a forth member of the set of secondary shared resources has already been reserved by a second secondary process instance after consecutively reserving third members of the set of secondary shared resources for exclusive access by the first secondary process instance, the method is releasing the reservations of the third members of the set of secondary shared resources by revoking the exclusive right of the first secondary process instance to access the third members of the set of secondary shared resources, and delaying the execution of the secondary instruction instance.

Another aspect of the present invention is that the primary instruction instances of the primary program instance are executed in a multiplicity of the primary process instances and the primary shared resources are reserved for exclusive access by the primary process instances within a primary execution container. The position of the primary instruction instance in the code of the application program is specified by a primary virtual memory address, the primary process instance is specified by a primary virtual process identifier, and the primary shared resource is specified by a primary virtual shared resource identifier. The secondary instruction instances of the secondary program instance are executed in a multiplicity of the secondary process instances and the secondary shared resources are reserved for exclusive access by the secondary process instances within a secondary execution container. The position of the secondary instruction instance in the code of the application program is specified by a secondary virtual memory address, the secondary process instance is specified by a secondary virtual process identifier, and the primary shared resource is specified by a secondary virtual shared resource identifier. The position of the primary instruction instance corresponds to the position of the secondary instruction instance when the primary virtual memory address matches the secondary virtual memory address, the primary process instance corresponds to the secondary process instance when the primary virtual process identifier matches the secondary virtual process identifier, and the primary shared resource corresponds to the secondary shared resource when the primary virtual shared resource identifier matches the secondary shared resource identifier.

Another aspect of the present invention is that the primary and the secondary shared resources are shared memory pages, and the corresponding identifiers of the shared memory pages are virtual memory addresses.

Another aspect of the present invention is that the method further comprises the following steps: After successful reservation of the members of the set of primary shared resources for exclusive access by the primary process instance, the method is accessing the set of primary shared resources and executing the primary instruction instance within the primary process instance. After successful reservation of the members of the set of secondary shared resources for exclusive access by the secondary process instance, the method is accessing the set of secondary shared resources and executing the secondary instruction instance within the secondary process instance.

Another aspect of the present invention provides a computer system for managing access to shared resources, which is running at least one primary program instance and at least one secondary program instance of the same application program. The system is comprising at least one primary processing unit and at least one secondary processing unit. The primary processing unit is requesting access to a set of primary shared resources in a first order for executing a primary instruction instance of the primary program instance within a primary process instance, reserving the set of primary shared resources in the first order by granting the primary process instance the exclusive right to access the members of the set of primary shared resources unless the primary process instance has already reserved the requested primary shared resource, and recording a sequence of corresponding reservation events for the members of the set of primary shared resources in the first order. The secondary processing unit is requesting access to a corresponding set of secondary shared resources in a second order for executing a corresponding secondary instruction instance of the secondary program instance within a corresponding secondary process instance, and reading the recorded sequence of reservation events in the first order. The reservation events are controlling the reservation of the set of secondary shared resources in the first order by granting the secondary process instance the exclusive right to access the members of the set of secondary shared resources unless the secondary process instance has already reserved the requested secondary shared resource.

Another aspect of the present invention is that the primary processing unit corresponds to a recorder component and the secondary processing unit corresponds to a replay component of a fault tolerance system.

Another aspect of the present invention is that the operating system kernel comprises adapted operating system kernel components for handling the requests to access the shared resources.

Another aspect of the present invention is that the primary and the secondary shared resources are shared memory pages and the adapted operating system kernel components are page fault handlers and access methods of page table entries for the shared memory pages.

Another aspect of the present invention is that the primary and secondary processing units may reside on separate computer systems.

Another aspect of the present invention provides a primary computer system for managing access to primary shared resources, which is running at least one primary program instance of an application program. The primary computer system comprises at least one primary processing unit. The primary processing unit is requesting access to a set of primary shared resources in a first order for executing a primary instruction instance of the primary program instance within a primary process instance. The primary processing unit is reserving the set of primary shared resources in the first order by granting the primary process instance the exclusive right to access the members of the set of primary shared resources unless the primary process instance has already reserved the requested primary shared resource, and recording a sequence of corresponding reservation events for the members of the set of primary shared resources in the first order. The reservation events are determined to control the reservation sequence of a secondary program instance of the same application program to a corresponding set of secondary shared resources for executing a corresponding secondary instruction instance of the secondary program instance within a corresponding secondary process instance.

Another aspect of the present invention provides a secondary computer system for managing access to secondary shared resources, which is running at least one secondary program instance of an application program. The secondary computer system comprises at least one secondary processing unit. The secondary processing unit is receiving a recorded sequence of reservation events from a primary program instance of the same application program. The reservation events are describing the reservations of a set of primary shared resources in a first order before executing a primary instruction instance of the primary program instance within a primary process instance. The secondary processing unit is requesting access to a corresponding set of secondary shared resources in a second order for executing a corresponding secondary instruction instance of the secondary program instance within a corresponding secondary process instance, and reading the recorded sequence of reservation events in the first order. The reservation events are controlling the reservation of the set of secondary shared resources in the first order by granting the secondary process instance the exclusive right to access the members of the set of secondary shared resources unless the secondary process instance has already reserved the requested secondary shared resource.

Another aspect of the present invention provides a computer program product for execution in a data processing system comprising computer program code portions for performing the following steps: For executing a primary instruction instance of a primary program instance of an application program, the method is requesting access to a set of primary shared resources in a first order within a primary process instance and reserving the set of primary shared resources in the first order by granting the primary process instance an exclusive right to access the members of the set of the primary shared resources unless the primary process instance has already reserved the requested primary shared resource. While reserving the members of the set of primary shared resources in the first order, the method is recording a sequence of corresponding reservation events. For executing a corresponding secondary instruction instance of a secondary program instance of the same application program within a corresponding secondary process instance, the method is requesting access to a corresponding set of secondary shared resources in a second order, reading the recorded sequence of reservation events in the first order. The reservation events are controlling the reservation of the corresponding set of secondary shared resources in the first order by granting the secondary process instance an exclusive right to access the members of the set of secondary shared resources unless the secondary process instance has already reserved the requested secondary shared resource.

BRIEF DESCRIPTION OF THE SEVERAL VIEWS OF THE DRAWINGS

The present invention is illustrated by way of example and is not limited by the shape of the figures of the drawings in which.

DETAILED DESCRIPTION

Figure 1:
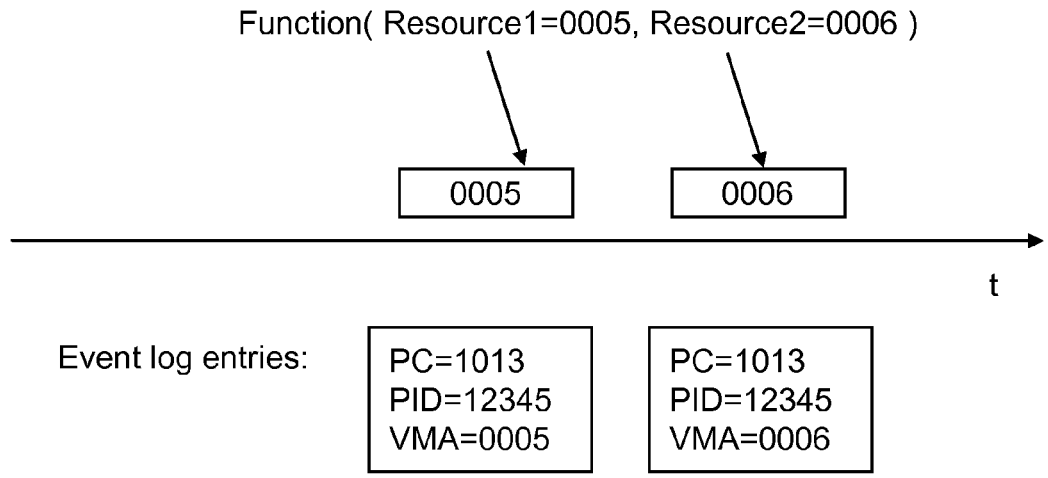
FIG. 1 is a process diagram showing the problem of a non-deterministic sequence of access events in the primary and secondary execution container according to the present invention.
Figure 1:
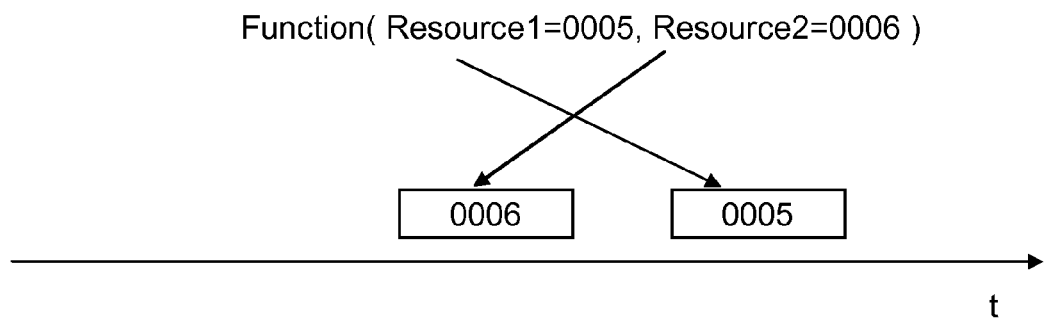

In the drawings and specification, there has been set forth a preferred embodiment of the invention and, although specific terms are used, the description thus given uses terminology in a generic and descriptive sense only and not for purposes of limitation. It will, however, be evident that various modifications and changes may be made thereto without departing from the broader spirit and scope of the invention as set forth in the appended claims.

The present invention can be realized in hardware, software, or a combination of hardware and software. Any kind of computer system—or other apparatus adapted for carrying out the methods described herein—is suited. A typical combination of hardware and software could be at least one general-purpose computer system with a computer program that, when being loaded and executed, controls the at least one computer system such that it carries out the methods described herein. The present invention can also be embedded in a computer program product, which comprises all the features enabling the implementation of the methods described herein, and which—when being loaded in the at least one computer system—is able to carry out these methods.

A computer program or computer program product in the present context mean any expression, in any language, code or notation, of a set of instructions intended to cause a system having an information processing capability to perform a particular function either directly or after either or both of the following a) conversion to another language, code or notation; b) reproduction in a different material form.

In the preferred embodiment of the present invention, a primary and a secondary processing unit are executing the same program code instructions within a primary and a secondary execution container, respectively. The primary and secondary processing units are either physical hardware or virtualized hardware. Virtualized hardware is a representation of potential physical hardware to the operating system. The virtualized hardware is providing resources and services to the operating system that are made available or emulated by the physical hardware. The system configuration may include more than one secondary execution container. To simplify the description, the figures only show one secondary execution container. In each container, the corresponding processing unit is executing multiple threads that are sharing multiple memory pages. The program code instructions are specified by an instruction address in the program code. Since the preferred embodiment implements single-threaded processes that share multiple resources, the term process is used in the remaining chapter. A process identifier specifies the process instance in the execution container. The corresponding process instances of the primary and secondary execution container have the same process identifier. The memory pages accessible to a process may be marked as being shareable with other processes or not. These shareable memory pages are denoted as shared memory pages and can be accessed by more than one process such that at least one of the processes may modify the shared memory pages that have a read/write access right. The preferred embodiment does not consider sharable memory pages that are known to be never written and have a read-only memory access right as shared memory pages.

Figure 2:
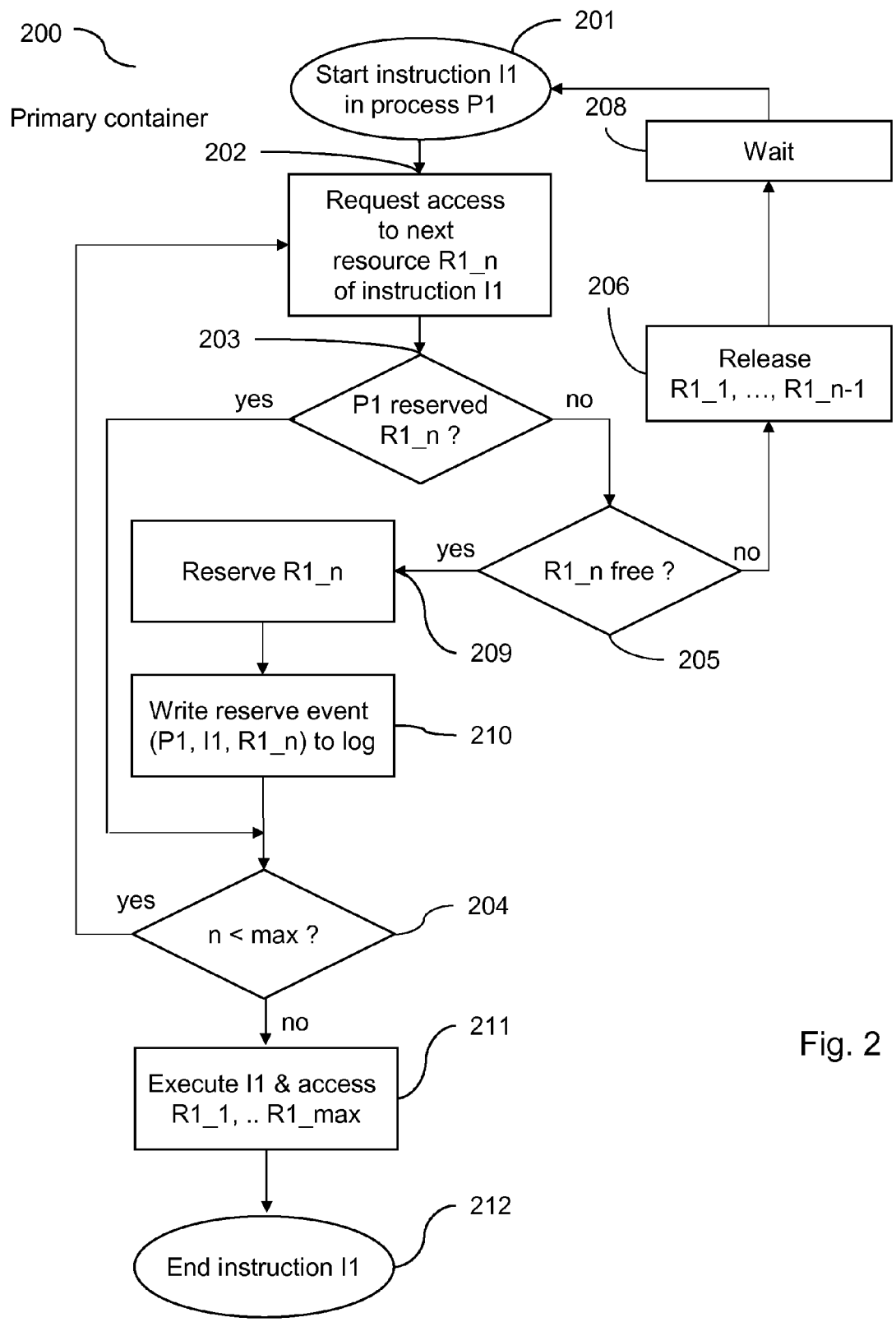
FIG. 2 is a flow chart of the reservation mechanism in the primary execution container according to the present invention.
Figure 3:
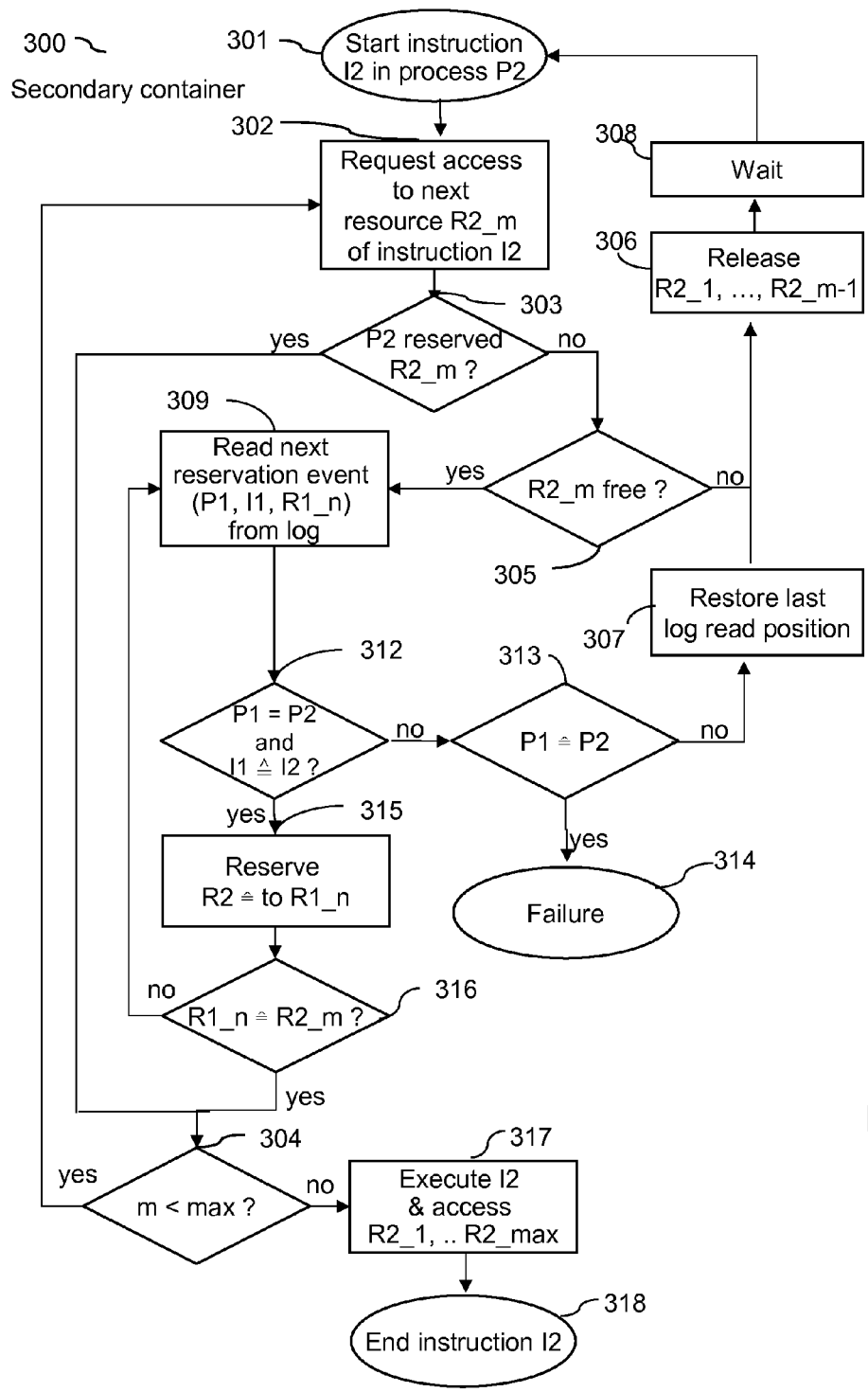
FIG. 3 is a flow chart of the reservation mechanism in the secondary execution container according to the present invention.

Each program code instruction may access no, one, or multiple shared memory pages. The shared memory pages are specified by a virtual memory address inside the execution container. Each process refers to a page table that maps the virtual memory address to its real address in the physical memory. Each entry of the page table refers to one of the virtual memory addresses and includes a page-present variable indicating if the page is available or not. When a new page table entry for a shared memory page is created, the page-present variable is set to indicate the state that the page is not available. Whenever a process requests access to a shared memory page for the first time, the process tries to reserve the page for exclusive access. If the page-present variable indicates that the memory page is not available, the process enters the customized page fault handler. The page fault handler tries to reserve the page and on success sets the page-present variable to indicate the state that the memory page is available. The default page fault handlers for shared memory pages are adapted to record reservation events in the primary execution container and to control the replay of reservation events in the secondary execution container. The detailed steps of the page fault handler are shown in FIGS. 2 and 3. The page fault handler sets an access-control variable indicating the state that the memory page is reserved for exclusive access by the process. After the reservation, the process accesses the reserved memory page. When the shared memory page is reserved for exclusive access by a first process and a second process is requesting access to the same shared memory page, the reservation attempt of the second process will fail because the access-control variable is set indicating that the shared memory page is reserved for exclusive access by the first process. The second process will wait and try to access the shared memory page at a later point in time. Depending on the operating system architecture, the page-present variable may be implemented as a page-present bit or a page-absent bit with opposite meaning in the page table entries (PTE).

When the process releases the reservation of the shared memory page, the page-present variable and the access-control variable are reset. Then, the page-present variable is indicating that the memory page is not available and the page fault handler will be executed at the next access request to the shared memory page.

FIG. 1 illustrates an example how a program code instruction uses a different access sequence to a set of shared memory pages. The program code instruction is executed within a primary and a secondary container. The virtualization layer of the containers creates the same virtual process identifier PID=12345 for corresponding process instances in each container. The program code instruction is identified by a program counter PC=1013 and includes two arguments which are accessing two shared memory pages referenced by their virtual memory addresses, VMA1=0005 and VMA2=0006, respectively. The architecture of the computer system allows access in a non-deterministic sequence. In the primary container, the program code instruction requests access to and reserves the virtual memory address VMA1 before VMA2. The access request sequence may happen to be different in the secondary container, that is, the virtual memory address VMA2 is requested before VMA1. The event log entries are recorded in the primary container and include the program counter PC, the virtual process identifier PID, and the virtual memory address VMA of the shared memory page. The recorded event log follows the sequence of the reservation events in the primary container. When the secondary container requests access to the virtual memory address VMA2 before VMA1, the present invention forces the secondary container to use the order of the recorded sequence of reservation events from the primary container, that is, VMA1 will be reserved before VMA2.

The reservation of shared memory pages can be generalized to shared resources. In the remaining chapter, the term shared resource is used instead of the expression shared memory page.

FIG. 2 shows the steps that the page fault handler is executing in the primary execution container (200). A specific primary process instance P1 starts (201) to execute a primary program code instruction instance I1, which requests access to a subset of the primary shared resources (R1_1, R1_2, ..., R1_max). The adjective "primary" means that the instruction instance, the shared resources and the process instances are referenced within the primary execution container. In a loop, the primary processing unit is consecutively requesting (202) access to the primary shared resources R1_1, R1_2 until R1_max, where max is the total number of shared resources requested by the primary instruction instance I1. Before the access of the primary shared resource R1_n, the primary processing unit tests (203) if the resource R1_n is reserved by the primary process instance P1. When the primary process instance P1 has already reserved the primary shared resource R1_n (203, "yes"), the primary processing unit tests (204) if the primary instruction instance I1 requires access to more primary shared resources, that is the case when n<max. When the process instance P1 has not yet reserved (203, "no") the primary shared resource R1_n, the primary processing unit tests (205) if the requested primary shared resource R1_n is free, which means that the primary shared resource R1_n has not been reserved by another primary process instance.

When a second primary process instance that is different from the first primary process instance P1 has already reserved the primary shared resource R1_n (205, "no"), the primary processing unit releases (206) the previous reservations of primary shared resources, R1_1, ..., R1_n−1, which were reserved during the execution of the primary instruction instance I1. Then, the primary processing unit is switching the primary process instance P1 to a waiting state for a finite amount of time and scheduling another primary process instance that is different from P1. When the operating system kernel schedules the primary process instance P1 again, the primary processing unit repeats to start (201) the same primary instruction instance I1 and requests access to the same set of the primary shared resources (R1_1, R1_2, ..., R1_max).

When the requested primary shared resource R1_n has not yet been exclusively reserved (205, "yes") by a second primary process instance, the first primary process instance P1 reserves (209) the resource R1_n and creates (210) an reservation event entry in the log. This entry is specified by the process identifier of the primary process instance P1, the program code address of the primary instruction instance I1, and the primary shared resource identifier R1_n. This means, that the event log contains a sequence of reservation events that are ordered in time. After the primary processing unit reserved the primary shared resource R1_n, the primary processing unit tests (204) if the primary instruction instance I1 needs to access more primary shared resources R1_n+1, ..., R1_max, that is the case when n<max. When the primary instruction instance I1 requires (204, "yes") access to more resources, the primary processing unit requests (202) access to the next resource, R1_n+1. When the reserved resource R1_n is (204, "no") the last resource R1_max required for the program code instruction, the primary process instance P1 accesses (211) all the primary shared resources (R1_1, ..., R1_max) while executing the primary instruction instance I1. After the end (212) of the primary instruction instance I1, the process instance starts executing the next program code instruction.

The reservations of the primary shared resources (R1_1, ..., R1_max) should be released after a finite period of time after the execution of the primary instruction instance I1. To save repeated reservation and release of the primary shared resources, the primary processing unit may leave the primary shared resources in a reserved state for a finite period of time and then release the primary shared resources asynchronously. Alternatively, the primary shared resources can be released when the operating system kernel switches the execution to a second primary process instance that is different from the first primary process instance P1. Whenever the primary shared resources are released, the primary processing unit creates a release event in an event log for asynchronous events, where the release event comprises at least one of the released primary shared resources. The release mechanism and the event log for the asynchronous events are not included in the FIG. 2.

FIG. 3 shows the steps that the page fault handler is executing in the secondary execution container (300). A specific secondary process instance P2 starts (301) to execute a secondary program code instruction instance I2 which requests access to a subset of the secondary shared resources (R2_1, R2_2, ..., R2_max). The adjective "secondary" means that the instruction instance, the shared resources and the process instances are referenced within the secondary execution container. In a loop, the secondary processing unit is consecutively requesting (302) access to the secondary shared resources R2_1, R2_2, ... R2_max, where max is the total number of shared resources requested by the secondary instruction instance I2.

Before accessing the secondary shared resource R2_m, the secondary processing unit tests (303) if the secondary shared resource R2_m is reserved by the secondary process instance P2. When the secondary process instance P2 has already reserved the secondary shared resource R2_m (303, "yes"), the secondary processing unit tests (304) if the secondary instruction instance I2 requires access to more secondary shared resources R2_m+1, ..., R2_max, that is, if m<max.

When the process instance P2 has not yet reserved (303, "no") the secondary resource R2_m, the secondary processing unit tests (305) if the requested resource R2_m is free, which means that the secondary shared resource R2_m has not been reserved by another secondary process instance. When a second secondary process instance that is different from the first secondary process instance P2 has already reserved the secondary shared resource R2_m (305, "no"), the secondary processing unit releases (306) the previous reservations of the secondary shared resources, that is, R2_1, . . . , R2_m−1, which were reserved during the execution of the secondary instruction instance 12. Then, the secondary processing unit is switching the secondary process instance P2 to a waiting state (308) for a finite amount of time and scheduling another secondary process instance that is different from the secondary process instance P2. When the operating system kernel schedules the secondary process instance P2 again, the secondary processing unit repeats to start (301) the same secondary instruction instance 12 and requests access to the same subset of the primary shared resources (R2_1, R2_2, . . . , R2_max) again.

When the requested resource R2_m has not yet been exclusively reserved (305, "yes") by a second secondary process instance, the first secondary process instance P2 reads (309) the subsequent entry from the event log. The corresponding reservation event was created when the primary process instance P1 executed the primary instruction instance I1 and reserved the primary shared resource R1_n.

The secondary processing unit tests (312) whether both the secondary process instance P2 corresponds to the primary process instance P1 and the secondary instruction instance 12 which is executed in the secondary execution container corresponds ($\hat{=}$) to the primary instruction instance I1 of the read event from the primary execution container. Correspondence of instruction instances means that the instruction instances have the same program code addresses. When the process instances or the addresses of the program code instructions do not match (312, "no"), the secondary process instance tests (313) if the secondary process instance P2 corresponds ($\hat{=}$) to the primary process instance P1 of the read event. When this test fails (313, "no"), the process identifier of the read event from the primary execution container does not match the corresponding value of the running process instance in the secondary execution container. This indicates that the secondary execution container is expected to switch execution to another secondary process instance. Then, the secondary processing unit restores (307) the previous read position of the event log before reading the last reservation event and releases (306) the secondary shared resources R2_1, . . . , R2_m−1 which were reserved during the execution of the secondary instruction instance 12, and waits (308) for a finite amount of time to allow scheduling of another process that is different from P2. When the primary and secondary process instances are the same, but the program code addresses of the primary and the secondary instruction instances are different (313, "yes"), the secondary processing unit encounters an unexpected situation and enters appropriate failure handling (314) because the secondary and primary execution container are out of sync.

When both the virtual process identifier P2 and the program code address of the secondary instruction instance 12 of the access request from the secondary execution container have the same values (312, "yes") as the corresponding identifiers P1 and I1 of the read reservation event from the primary execution container, the secondary processing unit reserves (315) the secondary shared resource R2 corresponding ($\hat{=}$) to the primary shared resource R1_n referenced in the read reservation event. This can be either the same secondary shared resource, that is, R2$\hat{=}$R2_m, that the secondary instruction instance 12 requests to access in the secondary execution container, or it can be another secondary shared resource of the set of the requested secondary shared resources (R2_m+1, . . . , R2_max).

After the reservation of the secondary shared resource R2, the secondary processing unit tests (316) if the primary shared resource R1_n from the reservation event corresponds ($\hat{=}$) to the requested secondary shared resource R2_m, that is R2=R2_m, in the secondary container. When the replay order of the reservations of the secondary shared resources is different from the recorded order of the reservation events of the primary shared resources, this test may fail (316, "no") and the secondary processing unit continues reading (309) the subsequent event from the event log.

When the requested secondary shared resource R2_m matches (316, "yes") the primary shared resource R1_n from the reservation event, the secondary processing unit tests (304) if the secondary instruction instance 12 needs to access more primary shared resources, R2_m+1, . . . , R2_max, that is, m<max. When the secondary shared resource R2_m is (304, "no") the last resource R2_max required for the instruction, the secondary process instance P2 accesses (317) all the primary shared resources (R2_1, . . . , R2_max) while executing the secondary instruction instance 12. After the secondary instruction instance 12 has ended (318), the secondary processing unit continues to execute the subsequent program code instructions.

Corresponding to the primary execution container, the reservations of the secondary shared resources (R2_1, . . . R2_max) should be released after the execution of the secondary instruction instance 12 after a finite period of time. The sequence of release events in the secondary execution container is following the sequence of recorded release events from the primary execution container. The release events, which are not covered by the flow charts in FIGS. 2 and 3, may be recorded in the primary container in the event log for asynchronous events and replayed in the secondary container asynchronously from the reservation events displayed in the FIGS. 2 and 3.

In a first alternative embodiment of the present invention, the claimed method is applied to multi-threaded processes, where multiple threads may share resources, such as memory locations, within one process. In some implementations of multi-threaded processes it may be required to associate a private page table to each thread.

In a second embodiment of the present invention, the shared resources may be accessed using another operation than a write operation, which may be a read operation, a permission change operation, a create operation, a delete operation, or alike.

In a third alternative embodiment of the present invention, a single instruction can be generalized to a sequence of instructions which may build up a logical unit of work in a transactional system.

In a forth alternative embodiment of the present invention, the sequence of instructions may be invoked by a function call and the shared resources can be an arbitrary subset of arguments. These shared resources may be semaphores, locks, pipes, files, service sockets etc.

In a fifth alternative embodiment of the present invention, the primary processing unit releases (206) the reservations of all the primary shared resources that the primary process instance P1 has already reserved for the execution of the primary instruction instance I1 and for the execution of all the previous primary instruction instances. In the same manner, the secondary processing unit releases (306) the reservations of all the secondary shared resources that the secondary process instance P2 has already reserved for the execution of the secondary instruction instance 12 and for the execution of all the previous secondary instruction instances.

The invention claimed is:

1. A computer system for managing access to shared resources, running at least one primary program instance of an application program and at least one secondary program instance of the same application program, the system comprising:
- a memory;
- a processor in communication with the memory, the processor for fetching instructions from memory and for executing fetched instructions, the processor comprising at least one primary processing unit and at least one secondary processing unit;
- the at least one primary processing unit for requesting access to a set of primary shared resources in a first order for executing a primary instruction instance of the primary program instance within a primary process instance, reserving the set of primary shared resources in the first order by granting the primary process instance the exclusive right to access the members of the set of primary shared resources unless the primary process instance has already reserved the requested primary shared resource, and recording a sequence of corresponding reservation events for the members of the set of primary shared resources in the first order;
- the at least one secondary processing unit for requesting access to a corresponding set of secondary shared resources in a second order for executing a corresponding secondary instruction instance of the secondary program instance within a corresponding secondary process instance, and reading the recorded sequence of reservation events in the first order controlling the reservation of the set of secondary shared resources in the first order by granting the secondary process instance the exclusive right to access the members of the set of secondary shared resources unless the secondary process instance has already reserved the requested secondary shared resource.

2. The computer system according to claim 1, wherein the primary processing unit corresponds to a recorder component and the secondary processing unit corresponds to a replay component of a fault tolerance system.

3. The computer system according to claim 1, wherein the operating system kernel comprises adapted operating system kernel components for handling the requests to access the shared resources.

4. The computer system according to claim 3, wherein the primary and the secondary shared resources are shared memory pages and the adapted operating system kernel components are page fault handlers and access methods of page table entries for the shared memory pages.

5. The computer system according to claim 1, wherein the reservation events are being determined to control the reservation sequence of the secondary program instance of the same application program to a corresponding set of secondary shared resources for executing a corresponding secondary instruction instance of the secondary program instance within a corresponding secondary process instance.

6. A secondary computer system for managing access to secondary shared resources, running at least one secondary program instance of an application program, and comprising:
- a memory;
- a processor in communication with the memory, the processor for fetching instructions from memory and for executing fetched instructions, the processor comprising at least one secondary processing unit;
- the at least one secondary processing unit for receiving a recorded sequence of reservation events from a primary computer system running at least one primary program instance of the same application program, the reservation events describing the reservations of a set of primary shared resources in a first order before executing a primary instruction instance of the primary program instance within a primary process instance, and requesting access to a corresponding set of secondary shared resources in a second order for executing a corresponding secondary instruction instance of the secondary program instance within a corresponding secondary process instance, and reading the recorded sequence of reservation events in the first order controlling the reservation of the set of secondary shared resources in the first order by granting the secondary process instance the exclusive right to access the members of the set of secondary shared resources unless the secondary process instance has already reserved the requested secondary shared resource.

* * * * *